(12) United States Patent
Gilbert et al.

(10) Patent No.: US 6,292,758 B1
(45) Date of Patent: Sep. 18, 2001

(54) LINEAR PERTURBATION METHOD FOR KALMAN FILTER TRACKING OF MAGNETIC FIELD SOURCES

(75) Inventors: Harold C. Gilbert, Placentia; Anthony Saglembeni, Tustin; Michael Rakijas, Yorba Linda; Kirk K. Kohnen, Fullerton, all of CA (US)

(73) Assignee: Raytheon Company, Lexington, KY (US)

( * ) Notice: Subject to any disclaimer, the term of this patent is extended or adjusted under 35 U.S.C. 154(b) by 0 days.

(21) Appl. No.: 09/174,681

(22) Filed: Oct. 19, 1998

(51) Int. Cl.$^7$ .................................................. G01C 21/00
(52) U.S. Cl. ...................... 702/150; 702/152; 702/153; 824/207.13; 824/207.14; 342/450; 342/463
(58) Field of Search ..................... 702/150, 152, 702/153; 324/207.13, 207.14; 801/207; 342/450, 463

(56) References Cited

U.S. PATENT DOCUMENTS

| | | | |
|---|---|---|---|
| 5,239,474 | * | 8/1993 | Eaton, Jr. et al. ............... 324/207.14 |
| 5,337,259 | * | 8/1994 | Breed .................................... 702/150 |
| 5,684,396 | * | 11/1997 | Aks et al. ......................... 324/207.13 |
| 5,731,996 | * | 3/1998 | Gilbert .................................. 702/150 |
| 5,831,873 | * | 11/1998 | Kohnen et al. ...................... 702/150 |

OTHER PUBLICATIONS

Wikso, John P., and Swinney, Kenneth R., "Scalar Miltipole Expansions and Their Dipole Equivalents", Journal of Applied Physics, (1985).

Dassot, Gilles, Chichereau, Claire, and Blanpain, Roland, "Data Association and Tracking From Acoustic Doppler and Magnetic Measurements", Signal Processing VIII, Theories and Applications (1996).

* cited by examiner

Primary Examiner—Marc S. Hoff
Assistant Examiner—Hien Vo
(74) Attorney, Agent, or Firm—Colin M. Raufer; Leonard A. Alkov; Glenn H. Lenzen, Jr.

(57) ABSTRACT

Methods including a Kalman filter tracking method for localizing a magnetic field source and which employs a linear perturbation method. The linear perturbation method linearizes an objective function in the neighborhood of the actual source enabling the source location to be computed in a single operation. Successive applications of the linear perturbation method lead to successive improvements in the localization result.

31 Claims, 2 Drawing Sheets

LINEAR PERTURBATION METHOD FOR KALMAN FILTER TRACKING OF MAGNETIC FIELD SOURCES

BACKGROUND

The present invention relates generally to methods for tracking magnetic source objects, and more particularly, to a linear perturbation method that provides for Kalman filter tracking of magnetic field sources.

The assignee of the present invention has heretofore developed numerous inventions that describe methods for locating an idealized magnetic dipole moment source by processing a set of magnetic field measurements collected at an array of points that may be arbitrarily distributed in space and time (i.e. fixed or moving sensors in any combination or arrangement). According to Maxwell's equations, the magnetic field of a dipole moment is a nonlinear function of the field position so that the field equation cannot be solved in terms of the source location. However, if the magnitude and orientation of the source's dipole moment vector is known then a set of matched filter processes may be applied to the measurements to determine the most likely source location. In this approach the volume of space containing the dipole source is represented by a grid of hypothesized locations and one matched filter process is executed per grid node. The resulting response will be maximum at the node nearest the actual dipole thereby indicating the approximate source location.

In practice, however, the dipole moment vector of the source is generally unknown. When this is the case, its three vector components are allowed to vary over the space of probable values, which is also partitioned into a discrete grid with each node representing the direction and magnitude of the dipole moment. Now the matched filter response is maximized over both grids simultaneously to determine both the unknown source moment and its location. U.S. Pat. No. 5,731,996 assigned to the assignee of the present invention teaches that the unknown dipole moment may be linearly estimated at each source location and that the estimating process may be integrated into the matched filter, thereby reducing the unknown source problem to nearly the same level of processing difficulty as the known source problem.

Relevant prior art known to the present inventors is as follows. U.S. Pat. No. 5,239,474 entitled "Dipole Moment Detection and Localization" discloses an algorithm that localizes a magnetic dipole moment source by maximizing an objective function over a grid of search points that spans the search volume. The objective function used is the correlation between the Anderson function coefficients of the signal, normalized by a range factor, and the Anderson coefficients of a dipole source with known or hypothesized orientation. An alternative objective function briefly mentioned is the correlation between the signal, normalized by a range factor, and the ideal signal of a hypothesized dipole source and location. Both methods are dependent on the Anderson functions in spherical coordinates which are suitable for linear arrays of magnetic field sensors but are difficult to apply to more general array geometries.

U.S. Pat. No. 5,731,996 entitled "Dipole moment detector and localizer" discloses an algorithm that also localizes by maximizing an objective function over a search grid. However, the magnetic dipole moment source does not need to be known or hypothesized because it is uniquely estimated at each grid point. Also, the more general electromagnetic field moment equation in Cartesian coordinates is used in lieu of Anderson functions to model the dipole field. This makes the method more suitable for arbitrary array geometries. The objective function is the correlation between the signal and the ideal signal of the estimated dipole source.

U.S. Pat. No. 5,684,396 entitled "Localizing magnetic dipoles using spatial and temporal processing of magnetometer data" discloses an algorithm that performs the same basic operations as U.S. Pat. No. 5,731,996 except that a moving dipole source may be hypothesized in lieu of a fixed one. The magnetic field is measured over a period of time, as well as various points in space, and the source position and track during the time period are both hypothesized. The same dipole estimate is sued and the same objective function is maximized to determine the most likely position and track.

U.S. patent application Ser. No. 09/174,682, filed Oct. 19, 1998, entitled "Magnetic Object Tracking Based on Direct Observation of Magnetic Sensor Measurements" (having assignee docket number PD-970267) discloses an algorithm having an entirely new approach to solving the magnetic dipole moment localization problem for a source that is moving. It assumes that the source has been detected by other means and the initial position and velocity have also been determined. It then uses a Kalman filter to track the arbitrary movement of the source using only the magnetic field measurements collected over an array of sensors. The Kalman filter models the probable behavior of the source and the physical relationship between the moving source and its changing dipole field. The method offers two advancements. First, the computational load to localize the moving source at each point in time is greatly reduced. Second, the plant model greatly enhances the estimates of location based on the magnetic field measurements.

Other prior art documents are as follows. A report was published by Irving S Reed and is entitled Adaptive Space-Time Airborne Arrays for Magnetic Anomaly Detection (MAD) of Submarines, Final Report of DARPA Contract DAAB07-86-C-S009, Adaptive Sensors Incorporated, March 1987. This report describes a method of detecting and localizing submarines as magnetic dipole sources that includes some elements disclosed in U.S. Pat. No. 5,239,474 and U.S. Pat. No. 5,731,996 cited above. Spherical coordinates and Anderson functions are used as in item 1, while an Anderson coefficients estimator similar to the dipole moment estimator of item 2 is used to eliminate dependence on the unknown dipole moment. An objective function very similar to the function disclosed in U.S. Pat. No. 5,731,996, although based on Anderson functions, is used to localize the source. However, because of the ambiguity inherent in the array geometry and scalar field sensor used in the MAD application, localization is limited to two dimensions.

An article was published by Keiichi Mori, and is entitled "Application of Weight Functions to the Magnetic Localization of an Object", *IEEE Transactions on Magnetics*, May 1989, Vol. 25, No. 3, pp. 2726–2731. This article describes a method of localizing magnetic dipole sources that is similar to the method disclosed in U.S. Pat. No. 5,731,996 cited above. The principal difference is that the objective function is a weighted least squares cost function rather than the signal correlation. Two means of establishing the weights are described but neither is based in the statistics of the problem. Therefore, this prior art method leads to a different localization result than the method disclosed in U.S. Pat. No. 5.831,996, and the result can be shown to be both asymptotically biased and suboptimal in a statistical sense.

The principal disadvantage of each of these prior art methods is that localization must be performed by computing the objective function at each grid point in a search volume in order to find the maximum. The reason for this is that the objective function depends in a nonlinear way on the hypothesized source location. The computational cost goes up exponentially with the number of unknowns. If the search volume is divided into ten sectors along each axis then localization requires evaluating the objective function at 1,000 grid points. If the source is in motion then the problem rapidly becomes more complex. If a simple linear motion is assumed and the velocity vector is hypothesized at ten possible values along each axis then the objective function must be evaluated at 1,000,000 grid points. Curvilinear motion is even more difficult.

Localization may be posed as a classical nonlinear optimization problem and any of a wide variety of nonlinear solution algorithms may be used to extract a solution in the neighborhood of an initial point. These methods may reduce the amount of computation substantially. However, if the signal-to-noise ration (SNR) is low then a large number of initial points must be tested because of the presence of local maxima arising from the noise.

Accordingly, it is an objective of the present invention to provide for a linear perturbation method that provides for Kalman filter tracking of magnetic field sources.

SUMMARY OF THE INVENTION

To accomplish the above and other objectives, the present invention comprises methods employing a linear perturbation method and iterative Kalman filter tracking method that provides for Kalman filter tracking of magnetic field sources. The present invention linearizes an objective function in the neighborhood of the actual source enabling the source location to be computed in a single operation. Successive applications of the operation lead to successive improvements in the localization result. Precise localization is achieved from a distant initialization point in just a few steps. Since linearization is based on magnetostatic physics and measurement statistics it is unbiased and asymptotically efficient.

In implementing one embodiment of the present invention, positions of a plurality of magnetic field sensors and the respective magnetic fields derived from the sensors are determined. An origin of a magnetic field source is hypothesized. Magnetic field functions of the magnetic field source are computed. Multipole coefficients of the magnetic field source are computed. The location of the magnetic field source is estimated. If the distance of the estimated location of the magnetic field source to the origin exceeds a convergence limit, the origin is set to the newly computed source location and the previous three steps are repeated until the convergence limit is reached. Once the convergence limit is reached, rank two field functions are computed. Then, an estimate of the magnetic dipole moment of the magnetic field source is computed. The magnetic source location and the magnetic dipole moment of the magnetic field source are then output.

In the Kalman filter tracking method of the present invention, a state vector and its error covariance for the magnetic field source are initialized. The state vector and error covariance are processed using a Kalman filter to predict a future state vector and its error covariance of the magnetic field source. The field source origin from the predicted state vector are extracted. Positions of a plurality of magnetic field sensors and the respective magnetic fields derived from the sensors are determined. Then, magnetic field functions of the magnetic field source are computed, multipole coefficients of the magnetic field source are computed, and the location of the magnetic field source is estimated. Then, a corrected state vector is computed. The Kalman prediction and correction processing is iterated until the corrected state vector is computed. Finally, a state vector that represents an optimal estimate of the track of the magnetic field source is output.

The present invention may be used in the plain localization problem disclosed in U.S. Pat. No. 5,731,996 and U.S. Pat. No. 5,684,396, as well as in the recursive tracking problem of item U.S. patent application Ser. No. 09/174,682, filed Oct. 19, 1998 (PD-970267). Thus the same process may be used to both initialize and update an arbitrary source track. The present invention may thus provide an improvement to processing efficiency for minimal stand-alone real-time sensor systems.

Compared to the above-described approaches of the present assignee discussed in the Background section, the present invention takes advantage of the next (third order) term in the multipole expansion to form an estimate of the source location by application of a sequence of linear operations. The estimate requires an initial approximation of the source location and the accuracy of the result depends on the accuracy of this approximation. The present invention produces an estimate of the source location in a single step, in lieu of maximizing the matched filter response over a volume search grid as before.

The present invention may be regarded as a perturbation method in that the distance from the initially approximated location, which is referred to as an origin, to the actual source must be small as compared to the mean distance from the same origin to the array of measurement points. The present perturbation method is intended to be used for stepwise convergence localization or as an input to recursive tracking methods. The use of other methods, such as tracking, for magnetic source localization is considered a part of this invention to the extent that the tracking method may utilize the present linear perturbation method. In particular, realizations of the present invention employing both the stepwise convergence procedure and the Kalman filter tracking procedure, are described and demonstrated herein.

There are three substantial advantages provided by the present invention. First, the amount of computation required to obtain a localization result is greatly reduced from the previously used methods described above. Second, the present method is ideally suited to incremental or recursive processing of measurement data, as is often required in real time tracking and surveillance systems. Third, the convergence precision of the present method is not limited to the search volume grid resolution but instead produces and exact optimization limited only by numerical precision.

The present invention also provides four beneficial features that are not always found in alternative methods. First, the source dipole moment is not required a priori since an optimal estimate is embedded within the present method. Second, the present method may be applied to an array of magnetic field measurements that span both space and time in an arbitrary manner, such as is disclosed in U.S. patent application Ser. No. 09/174,682, filed Oct. 19, 1998 (PD-970267). Third, the present method provides an estimate of the localization error associated with the localization estimate at each convergence processing step. Fourth, when integrated with a Kalman filter, the associated plant model improves the location estimate for sources in relative motion with respect to the array.

The present invention may be used in magnetic sensor array systems for detection, localization, tracking, and classification of source objects. The present invention may also be used in any application wherein the principal benefits of reduced processing load and linearized sequential tracking would improve the system. Military applications for the present invention include magnetic surveillance and tracking of ground vehicles in tactical areas, magnetic surveillance and tracking of ocean surface and undersea vehicles, mine hunting and harbor defense, and magnetic surveillance and tracking of airborne vehicles. Commercial applications for the present invention include airport ground traffic monitoring and highway vehicle traffic monitoring.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
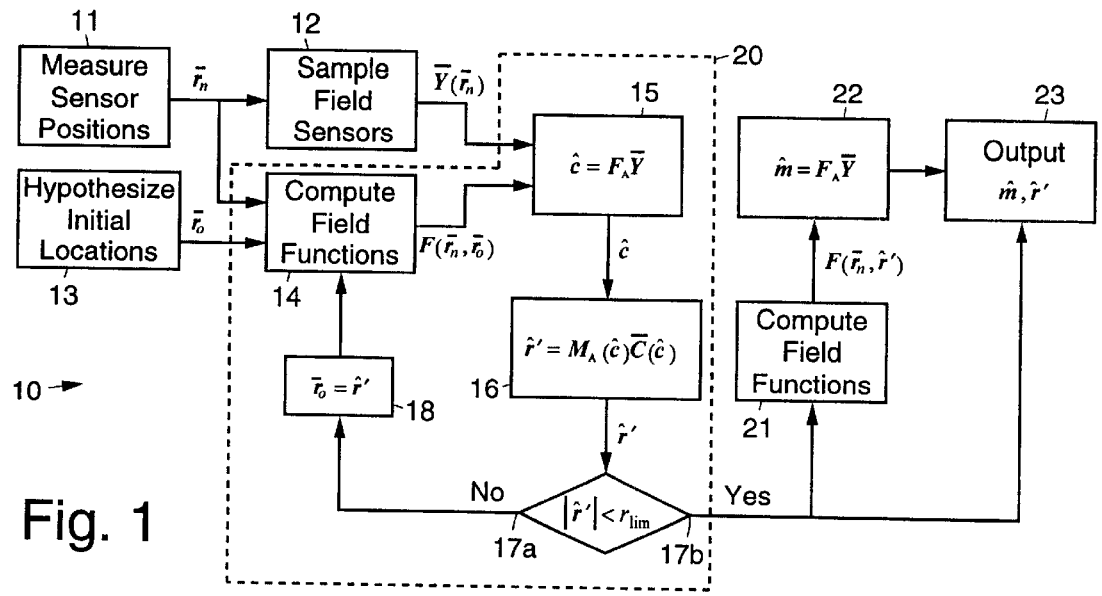
FIG. 1 illustrates a processing flow diagram for source localization by stepwise convergence.

In order to fully understand the present invention, a theoretical basis for this improved processing method will first be discussed. The present invention is presented in Cartesian coordinates for ease of understanding. However, the present method may be derived and realized in any orthogonal curvilinear coordinate system, and is thus not limited to any particular coordinate system.

Any magnetostatic field that is generated by a localized source may be expanded about an arbitrary point with a suitable series. To analyze the exterior field, an origin is selected within the source volume and the field expression is valid at all points outside the source volume. If Cartesian coordinates are considered and using a Taylor series expansion, the well known multipole moment expansion is obtained.

$$B^i(\bar{r}) = F^{i,j}(\bar{r})c_j + F^{i,j,k}(\bar{r})c_{j,k} + F^{i,j,k,l}(\bar{r})c_{j,k,l} + \ldots \quad \{1\}$$

Here, the more common B-field expansion is used and their corresponding multipole coefficients $_qc$ which are proportional to the true magnetic multipole moments but are not the same physical quantity. The $^{q+1}F$ are field shape functions of position $\bar{r}$ and the Einstein summation convention is used ($^{q+1}F$ is a rank q+1 contravariant tensor and $_qc$ is a rank q covariant tensor). The index i ranges over the three Cartesian components of the magnetic field vector, $B^{i=1}=B_x$ and so on. The subscript j ranges over the three components of the dipole moment vector, $c_{j=1}=m_x$ and so on. Higher order indices (k,l, . . . ) each range over the three components of the higher order multipoles. Factors with like indices in the contravariant and convariant positions are multiplied together and summed over the range of the index, for example $F^{i,j}c_j = F^{i,x}c_x + F^{i,y}c_y + F^{i,z}c_z$. The exact form of $^{q+1}F$ for the first four ranks is as follows.

$$F^i = \frac{r_i}{r^3} \quad \{2\}$$

$$F^{i,j} = \frac{3r_i r_j - \delta^i_j r^2}{r^5}$$

$$F^{i,j,k} = \frac{15 r_i r_j r_k - 3 r^2 (\delta^i_j r_k + \delta^i_k r_j + \delta^j_k r_i)}{r^7}$$

$$F^{i,j,k,l} = \frac{105 r_i r_j r_k r_l - 15 r^2 (\delta^i_j r_k r_l + \delta^i_k r_j r_l + \delta^i_l r_j r_k + \delta^j_k r_i r_l + \delta^j_l r_i r_k + \delta^k_l r_i r_j) + 3 r^4 (\delta^i_j \delta^k_l + \delta^i_k \delta^j_l + \delta^i_l \delta^j_k)}{r^7}$$

It can also be shown that the derivatives of the field shape functions are the field shape functions of the next higher rank. Of course, this is to be expected since they are derived from the Taylor series expansion.

$$\frac{dF^i(\bar{r})}{dr_j} = -F^{i,j}(\bar{r}), \quad \frac{dF^{i,j}(\bar{r})}{dr_k} = -F^{i,j,k}(\bar{r}), \quad \{3\}$$

$$\frac{dF^{i,j,k}(\bar{r})}{dr_l} = -F^{i,j,k,l}(\bar{r})$$

If a magnetic dipole source exists somewhere within a search volume it may be described by its moment vector $\bar{m}$ and its position vector $\bar{r}'$ (the prime designates a source position) with respect to the assumed origin. The N magnetostatic field sensors are at known positions $\bar{r}_n$ with respect to the same origin. The coefficients $_qc$ may be estimated from a set of actual field measurements $B^{i,n}$(i-th component of the magnetic field vector at the n-th sensor location) by inverting the field shape functions. Since the moment equation is linear in the coefficients it is natural to form a matrix equation in which the field measurements and unknown coefficients comprise column vectors.

$$\bar{B} = F\bar{c} \quad \{4\}$$

However, there are linear dependencies in the higher order terms. If o•p•q are arbitrary indices then the following linear relationships are true.

$$F^{i,p,q} = F^{i,q,p} \quad \begin{vmatrix} F^{i,o,p,q} = F^{i,o,q,p} = F^{i,p,o,q} = F^{i,p,q,o} = F^{i,q,o,p} = F^{i,q,p,o} \\ F^{i,p,q,q} = F^{i,q,p,q} = F^{i,q,q,p} \\ F^{i,o,o,o} + F^{i,o,p,p} + F^{i,o,q,q} = 0 \end{vmatrix} \quad \{5\}$$

$$F^{i,o,o} + F^{i,p,p} + F^{i,q,q} = 0$$

Since the i-subscript represents the rows, the relationships above indicate the linearly dependent columns of F. The coefficients which can be uniquely evaluated may therefore be arranged as follows.

$$\bar{F}^i = \begin{bmatrix} F^{i,1} \\ F^{i,2} \\ F^{i,3} \\ F^{i,1,1} \\ F^{i,3,3} \\ F^{i,1,2} \\ F^{i,2,3} \\ F^{i,3,1} \\ F^{i,1,2,2} \\ F^{i,2,3,3} \\ F^{i,3,1,1} \\ F^{i,1,3,3} \\ F^{i,2,1,1} \\ F^{i,3,2,2} \\ F^{i,1,2,3} \end{bmatrix}^T, \quad \{6\}$$

$$\bar{c} = \begin{bmatrix} c_1 \\ c_2 \\ c_3 \\ c_{1,1} - c_{2,2} \\ c_{3,3} - c_{2,2} \\ c_{1,2} + c_{2,1} \\ c_{2,3} + c_{3,2} \\ c_{3,1} + c_{1,3} \\ c_{1,2,2} + c_{2,1,2} + c_{2,2,1} - c_{1,1,1} \\ c_{2,3,3} + c_{3,2,3} + c_{3,3,2} - c_{2,2,2} \\ c_{3,1,1} + c_{1,3,1} + c_{1,1,3} - c_{3,3,3} \\ c_{1,3,3} + c_{3,1,3} + c_{3,3,1} - c_{1,1,1} \\ c_{2,1,1} + c_{1,2,1} + c_{1,1,2} - c_{2,2,2} \\ c_{3,2,2} + c_{2,3,2} + c_{2,2,3} - c_{3,3,3} \\ c_{1,2,3} + c_{2,3,1} + c_{3,1,2} - c_{2,1,3} + c_{1,3,2} + c_{3,2,1} \end{bmatrix} \begin{matrix} \}_1 c \text{ Dipole} \\ \\ \\ \}_2 c \text{ Quadrupole} \\ \\ \\ \\ \}_3 c \text{ Octupole} \\ \\ \\ \\ \end{matrix}$$

$\bar{F}^i$ is the i-th row of the field shape matrix F. Now consider the magnetostatic potential field ψ of a magnetic dipole moment vector hat is offset from the origin by a small distance $\bar{r}'$.

$$\Psi = \bar{m} \cdot \bar{g}(\bar{r}, \bar{r}'), \quad \bar{g}(\bar{r}, \bar{r}') = \frac{\bar{r} - \bar{r}'}{|\bar{r} - \bar{r}'|^3} \quad \{7\}$$

Expand the function $\bar{g}(\bar{r}, \bar{r}')$ in a Taylor series.

$$g^i(\bar{r}, \bar{r}') = F^i(\bar{r}) + F^{i,j}(\bar{r})r'_j + \frac{1}{2!}F^{i,j,k}(\bar{r})r'_j r'_k + \frac{1}{3!}F^{i,j,k,l}(\bar{r})r'_j r'_k r'_l + \ldots \quad \{8\}$$

$$\Rightarrow \Psi = F^i(\bar{r})m_i + F^{i,j}(\bar{r})m_i r'_j + \frac{1}{2!}F^{i,j,k}(\bar{r})m_i r'_j r'_k + \frac{1}{3!}F^{i,j,k,l}(\bar{r})m_i r'_j r'_k r'_l + \ldots \quad \{9\}$$

To compute the magnetostatic field, take the negative gradient of the potential field.

$$B\bar{B} = -\nabla \psi \quad \{10\}$$

$$\Rightarrow B^i(\bar{r}) = F^{i,j}(\bar{r})m_j + F^{i,j,k}(\bar{r})m_j r'_k + \frac{1}{2!}F^{i,j,k,l}(\bar{r})m_j r'_k r'_l + \ldots \quad \{11\}$$

When these terms are equated to the multipole expansion of an arbitrary field the multipole coefficients for the dipole moment and its position may be derived.

$$c_j = m_j, \quad c_{j,k} = m_j r'_k, \quad c_{j,k,l} = \frac{m_j r'_k r'_l}{2!} \quad \{12\}$$

Now suppose that the multipole coefficient vector $\bar{c}$ has been estimated in a least squares sense by taking the pseudo inverse of {4}, and that the field $\bar{B}$ is believed to be due to a single dipole source. Then an estimate is provided of the dipole moment vector $\hat{m}$. This is discussed in U.S. Pat. No. 5,731,996.

$$\hat{c} = F_A \bar{B}, \quad F_A = (F^T F)^{-1} F^T, \quad \hat{m} = \begin{bmatrix} c_1 \\ c_2 \\ c_3 \end{bmatrix} \quad \{13\}$$

The vector $\hat{c}$ is an estimate (^ indicates an estimate of the true value) of the multipole coefficients $\bar{c}$ because the infinite Taylor series {11} must be truncated to perform the finite matrix inversion. The matrix $F$. is the adjoint of the F matrix. If $\bar{r}'$ is zero, the Taylor series collapses to just the first term and the dipole moment estimate is exact. Next, a set of linear equations is formed in the unknown dipole position.

$$M\bar{r}' = \bar{C} \quad \{14\}$$

$$M = \begin{bmatrix} c_1 & -c_2 & 0 \\ 0 & -c_2 & c_3 \\ c_2 & c_1 & 0 \\ 0 & c_3 & c_2 \\ c_3 & 0 & c_1 \\ c_{2,2} - c_{1,1} & c_{1,2} + c_{2,1} & 0 \\ 0 & c_{3,3} - c_{2,2} & c_{2,3} + c_{3,2} \\ c_{3,1} + c_{1,3} & 0 & c_{1,1} - c_{3,3} \\ c_{3,3} - c_{1,1} & 0 & c_{3,1} + c_{1,3} \\ c_{1,2} + c_{2,1} & c_{1,1} - c_{2,2} & 0 \\ 0 & c_{2,3} + c_{3,2} & c_{2,2} - c_{3,3} \\ c_{2,3} + c_{3,2} & c_{3,1} + c_{1,3} & c_{1,2} + c_{2,1} \end{bmatrix},$$

$$\bar{C} = \begin{bmatrix} c_{1,1} - c_{2,2} \\ c_{3,3} - c_{2,2} \\ c_{1,2} + c_{2,1} \\ c_{2,3} + c_{3,2} \\ c_{3,1} + c_{1,3} \\ 2(c_{1,2,2} + c_{2,1,2} + c_{2,2,1} - c_{1,1,1}) \\ 2(c_{2,3,3} + c_{3,2,3} + c_{3,3,2} - c_{2,2,2}) \\ 2(c_{3,1,1} + c_{1,3,1} + c_{1,1,3} - c_{3,3,3}) \\ 2(c_{1,3,3} + c_{3,1,3} + c_{3,3,1} - c_{1,1,1}) \\ 2(c_{2,1,1} + c_{1,2,1} + c_{1,1,2} - c_{2,2,2}) \\ 2(c_{3,2,2} + c_{2,3,2} + c_{2,2,3} - c_{3,3,3}) \\ 2(c_{1,2,3} + c_{2,3,1} + c_{3,1,2} + c_{2,1,3} + c_{1,3,2} + c_{3,2,1}) \end{bmatrix}$$

Now the dipole position may be estimated in a least squares sense by taking the pseudo inverse of {14}.

$$\hat{r}' = M \cdot \bar{C}, \quad M = (M^T M)^{-1} M^T \quad \{15\}$$

Equations {13} and {15} provide direct linear estimates of the source dipole moment $\hat{m}$ and source location $\hat{r}'$. In a sensor system the measurements of sensor positions $\bar{r}_n$ and the magnetic field $\bar{B}_n$ contain measurement error that results in errors in the estimates, beyond the errors introduced by truncating the Taylor series expansion. From {11} is may be seen that errors in measuring the sensor position can be transformed into equivalent errors in the magnetic field measurements. For a first order approximation, consider just the first term in {11}.

$$\frac{\partial}{\partial r_n} B^i(\bar{r}) = \frac{\partial}{\partial r_n} F^{i,j}(\bar{r}) m_j = -F^{i,j,n}(\bar{r}) m_j \qquad \{16\}$$

Here, the index n ranges over all the vector components of all sensor locations. The sensor position measurement errors $\Delta r_n$ transform linearly into equivalent magnetic field measurement errors $\Delta B^{i\cdot}$ $$\Delta B^i(\bar{r}) = -\Delta r_n F^{i,j,n}(\bar{r}) m_j \qquad \{17\}$$

Conventionally, a measurement vector $\bar{Y}$ is constructed including the exact field value $\bar{B}$ plus additive noise $\bar{N}$ representing all measurement errors.

$$\bar{Y} = \bar{B} + \bar{N} \qquad \{18\}$$

It can be shown that the pseudo inverse estimators in {13} and {15} are minimum mean square error estimators, that is they minimize the mean square error between the actual magnetic field at the positions $\bar{r}_n$ and the truncated Taylor series representation. Minimum mean square estimators can be generalized by introducing an arbitrary positive definite weighting matrix $W_c$ that alters the relative significance of each error component.

$$\hat{c}_{MMSE} = (F^T W_c F)^{-1} F^T W_c \bar{Y} \qquad \{19\}$$

Further, it can be shown that if the statistics of the noise vector $\bar{N}$ comprise a mean of zero and a covariance matrix $R_N$ then a maximum likelihood estimate of $\bar{c}$ is obtained by using the inverse of $R_N$ as the weighting matrix.

$$\hat{c}_{MLE} = (F^T R_N^{-1} F)^{-1} F^T R_N^{-1} \bar{Y}, \quad R_N = E\{\bar{N}\bar{N}^T\} \qquad \{20\}$$

The maximum likelihood estimate is unbiased and its error covariance is the projection of the noise covariance onto the space of the coefficients.

$$\bar{\epsilon} = \hat{c}_{MLE} - \bar{c}, \quad R_C = E\{\bar{\epsilon}_c \bar{\delta}\bar{c}^T\} = (F^T R_N^{-1} F)^{-1} \qquad \{21\}$$

Similarly, a maximum likelihood estimate of $\bar{r}'$ may be formed.

$$\hat{r}'_{MLE} = (M^T W_r M)^{-1} M^T W_r \bar{C}, \quad \bar{\epsilon}_r = \hat{r}'_{MLE} - \bar{r}', \quad R_r = E\{\bar{\epsilon}_r \bar{\epsilon}_r^T\} = (M^T W_r M)^{-1} \qquad \{22\}$$

In taking the expected value the error in M has been neglected. In this case the weighting matrix W, for the maximum likelihood estimate is the inverse of the error covariance in $\bar{C}$.

$$W_r = (T R_c T^T)^{-1} \qquad \{23\}$$

$$T = \begin{bmatrix} 0 & 0 & 0 & 1 & 0 & \cdots & 0 \\ 0 & 0 & 0 & 0 & 1 & \cdots & 0 \\ \vdots & \vdots & \vdots & \vdots & \vdots & \ddots & \vdots \\ 0 & 0 & 0 & 0 & 0 & \cdots & 1 \end{bmatrix}$$

The matrix T is a simple transform operator that selects the elements of $\bar{c}$ that comprise the vector $\bar{C}$. The one step localization error $\bar{\epsilon}_r$ may be described in terms of the measurement noise vector $\bar{N}$.

$$R_r = \{M^T [T(F^T R_N^{-1} F)^{-1} T^T]^{-1} M\}^{-1} \qquad \{24\}$$

Source localization by stepwise convergence in accordance with the present invention will now be described. Referring to the drawing figures, FIG. 1 depicts a general localization process 10 wherein the present linear perturbation method 20 is used to sequentially compute improving estimates of the source position in lieu of attempting to maximize a response function over a search grid or invoking a conventional nonlinear solution algorithm. Sensor positions $\bar{r}_n$ may be measured 11 once if the sensors are fixed, or concurrently with each magnetic field measurement 12 $\bar{Y}$ if the sensors are moving. $\bar{Y}$ may include measurements collected from multiple sensors at a single instant, or from a single sensor at multiple instants, or as a combination of measurements collected over multiple sensors and over multiple instants in time. One or more field source origins $\bar{r}_o$ may be hypothesized 13, depending on the geometry of the sensor array and search volume. The magnetic field functions $F(\bar{r}_n, \bar{r}_o)$ are computed 14 in accordance with {2} and formatted into a matrix in accordance with {6}.

It is important to note that the n-th sensor at $\bar{r}_n$ may measure only one or two of the vector components of the magnetic field and that it is not necessary to measure all three components. If the sensor measures only the scalar magnitude of the field it may be treated as a single axis measurement in that the source field is projected along the vector of the dominant background of the Earth's magnetic field.

Next, the multipole coefficients ĉ are computed 15 in accordance with {20} and the (dipole) source location r̂' is computed 16 in accordance with {22}. If the magnitude of r̂', that is the distance of the estimated source location from the origin $\bar{r}_o$, exceeds 17a the convergence limit $r_{lim}$ then the origin is set 18 to the new source location $\bar{r}_o = \hat{r}'$ and the process is repeated. The result of each iteration is that the magnitude of r̂' converges rapidly to zero and $\bar{r}_c$ then represents the actual source location. Once the convergence limit is reached 17b then the rank two field functions $^2F(\bar{r}_n, \hat{r}')$ are computed 21 one more time for use in estimating 22 the magnetic dipole moment m̂ in accordance with {20}. This last step is necessary because the error in the dipole moment estimate contained in the higher ranking ĉ vector is substantially larger than the error in that results when the rank one moment is estimated. The process 10 outputs 23 the magnetic dipole source location r̂' and the magnetic dipole moment m̂.

The most effective array configuration for three-dimensional localization uses sensors uniformly spaced over the surface of a sphere in which the search volume is the interior of the sphere. The minimum array of this type has four sensors positioned at vertices of an equilateral tetrahedron. The sensors are equally spaced from each other and from an origin at the centroid of the tetrahedron.

Figure 2:
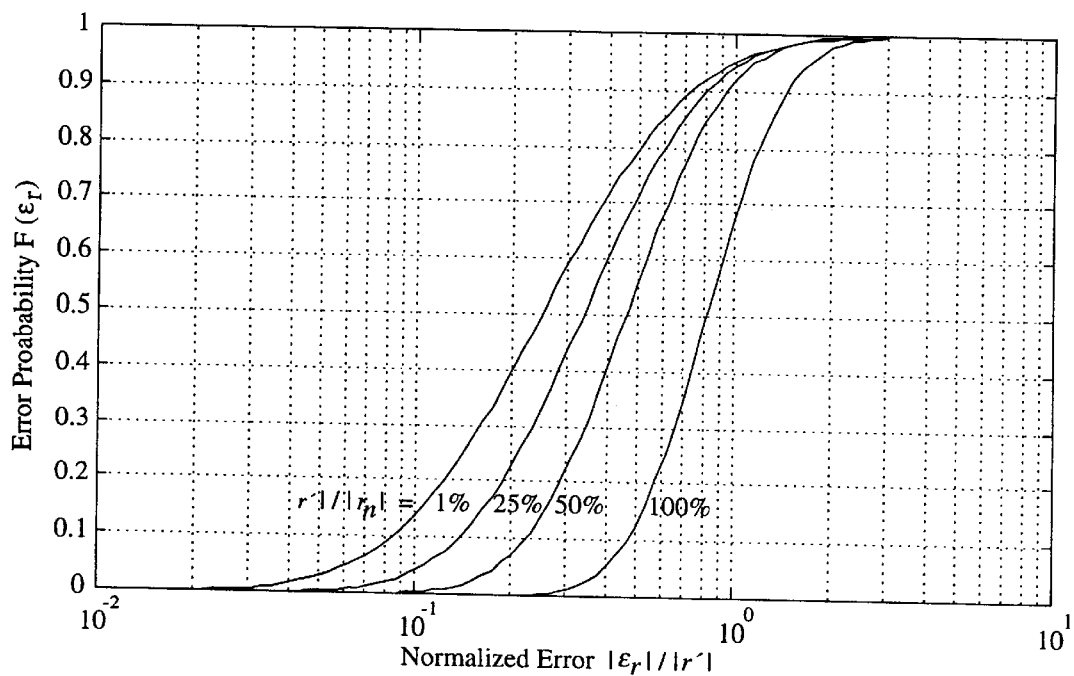
FIG. 2 illustrates a single step localization error for tetrahedral array of four sensors using rank 3 field functions.

FIG. 2 shows the localization performance of such an array using the rank 3 multipole moment expansion {1}, that is, the first two terms of the Taylor series. The hypothesized origin $\bar{r}_o$ is at the center of the circumscribed sphere, and the error curves are shown for an actual dipole source that is displaced from this origin in a random direction. The amount of displacement is specified in terms of the distance from the origin to the sensors $|\bar{r}'|/|\bar{r}_n|$. The dipole moment orientation is also random. The localization error for a single processing step is normalized by the source offset $|\bar{\epsilon}_r|/|\bar{r}'|$.

The most effective array configuration for three-dimensional localization consists of sensors uniformly spaced over the surface of a sphere in which the search volume is the interior of the sphere. The minimum array of this type has four sensors positioned at the verticies of an equilateral tetrahedron. The sensors are equally spaced from each other and from an origin at the centroid of the tetrahedron. FIG. 2 shows the localization performance of such an array using the rank 3 multipole moment expansion {1}, that is, the first two terms of the Taylor series. The hypothesized origin $\bar{r}_o$ is at the center of the circumscribed sphere, and the error curves are shown for an actual dipole source that is displaced from this origin in a random direction. The amount of displacement is specified in terms of the distance from the origin to the sensors $|\bar{r}'|/|\bar{r}_n|$. The dipole moment orientation is also random. The localization error for a single processing step is normalized by the source offset $|\bar{\epsilon}_r|/|\bar{r}'|$. The curves show the cumulative distribution function of the normalized errors. For example, if the source offset is 0.5 of the sensor radii ($|\bar{r}'|/|\bar{r}_n|$=50%), then 50% of the time after the next step, the localization error will be 46% of the offset or less. Thus, the next origin placement is expected to reduce the offset by about one half. Also, 80% of the time at the same initial $|\bar{r}'|/|\bar{r}_n|$, error will be 73% of the offset or less. Note that there is an 8% probability that the next origin placement will be further from the actual source than the original, but that the next localization will probably reduce the error (The probability of two successive increases is 8% or 0.64%, three successive increases is 0.05%, and so on.). Although the single step error can diverge, the probability of continuing multiple step divergence is eliminated by the fact that an actual source dipole orientation is nonrandom between multiple steps, which is contrary to the assumption on which these curves are based. Also note that the localization error converges rapidly to zero as the origin is moved successively closer to the actual source.

FIG. 2 does not include error due to measurement noise as in {6}, but only the error due to truncating the Taylor series. Within reasonable limits measurement noise does not affect the convergence behavior of this method but only the point to which the solution converges. That is, greater measurement noise leads to greater probable error in the final solution. Convergence step error may be reduced, especially for offsets below 50%, by including higher order terms of the Taylor series expansion. It is also reduced by increasing the number of sensors. Localization error in the final solution is reduced by increasing SNR.

Ordinary nonlinear techniques attempt to localize by minimizing a cost function, usually the sum of the squared errors between actual measurements and a model function. Methods such as the Newton-Raphson algorithm use first and second derivatives of the model function to optimize the cost function. When applied to the magnetic dipole field model these methods generate functions similar to {1}, {2}, and {3}, and therefore might be expected to perform as well as the present invention. However, they do not take advantage of the structural relationship between the field of the magnetic dipole and its multipole moment terms to form a localization estimate in a single step, in that they function only as stepwise optimizers of the cost function. This leads to a loss in efficiency compared to the present linear perturbation method.

Since the present invention is a perturbation methods 20, its performance depends on initial offset of the source from the hypothesized origin. A large search volume may be processed by hypothesizing 13 multiple origins, as in the prior search grid methods. The difference is that the initial points maybe widely separated so that only a few are required. For efficient array geometries such as the tetrahedron example a 50% offset, $|\bar{r}'|/|\bar{r}_n| \leq 1/2$, guarantees rapid convergence. Using this limit, a dipole source may be localized at any point within the tetrahedral search volume from one of four starting points. In the first process cycle, estimates are formed using each of four initially hypothesized origins 13. The point best situated for localizing the actual source is determined by examining the trace of the four localization error covariances $R_r$. The origin that leads to the minimum variance sum is then used in all subsequent processing cycles.

Source localization by Kalman tracking will now be discussed. It is possible, although not practical, to use the methods of the prior art to obtain a time series of localization points for use in tracking a target that is moving with respect to the sensor array. In this case the objective function must be maximized over the search grid at every processing time instance. Also, the search grid must be refined or some auxiliary nonlinear method must be introduced to improve localization resolution, otherwise a stable target track is difficult to obtain.

However, tracking is a recursive process when it is performed in real time so that a localization method based on small perturbations becomes ideal. The Kalman filter is a favored method for use in real time tracking and serves as an example of the linear perturbation methods 20 of localization using magnetic field sensors. The Kalman filter is based on a plant model that uses the dynamic behavior of the source object to improve the estimates of source position and velocity. Typically the Kalman filter tracking process is defined by five equations sequentially applied to the incoming data stream. Let the system behavior be described by a discrete system equation and an observation equation.

$$\bar{x}_k = \phi_{k,k-1}\bar{x}_{k-1} + \bar{w}_{k-1}, \quad \bar{z}_k = H_k \bar{x}\text{hd } k + \bar{v}_k \quad \{25\}$$

For tracking, $\bar{x}_k$ is the state vector which usually contains the target position, velocity, and acceleration vectors at time $t_k$. It may also contain angular orientation, angular velocity, and angular acceleration components. $\phi_{k,k-1}$ is the state transition matrix that models the unforced change in state from time $t_{k-1}$ to time $t_k$. $\bar{w}_k$ is a random forcing function, sometimes called plant noise, that allows the state to adapt to changes dictated by the observations. $\bar{z}_k$ is the vector of measurements or observations and is related to the state vector by the observation matrix $H_k$, and $\bar{v}_k$ is a random vector of measurement errors. Now let the random variables of {25} be represented by their first two statistical moments.

$$E\{\bar{w}_k\} = \bar{O}$$

$$E\{\bar{v}_k\} = \bar{O}$$

$$E\{\bar{w}_k \bar{w}_k^T\} Q_k$$

$$E\{\bar{v}_k \bar{v}_k^T\} = R_k \quad \{26\}$$

$Q_k$ is the plant noise covariance and $R_k$ is the measurement error covariance. The Kalman filter tracking process for this system may be defined by the following steps.

1. $\hat{x}_{k|k-1} = \phi_{k,k-1}\hat{x}_{k-1}$

2. $P_{k|k-1} = \phi_{k,k-1}P_{k-1}\phi_{k,k-1}^T + Q_{k-1}$

3. $K_k = P_{k|k-1}H_k^T(H_k P_{k|k-1}H_k^T + R_k)^{-1}$

4. $\hat{x}_{k|k} = \hat{x}_{k|k-1} + K_k(\bar{z}_k - H_k\hat{x}_{k|k-1})$

5. $P_{k|k} = P_{k|k-1} - K_k H_k P_{k|k-1}$ {27}

Step 1 predicts the future state vector at the next sample time using the model behavior. Step 2 predicts the error covariance $P_k$ associated with the state vector. Step 3 computes the optimal gain matrix $K_k$ which determines how much the new measurement data will affect the estimator. Step 4 corrects the predicted state vector according to the new measurements. Step 5 corrects the associated error covariance of the state vector. The results of Steps 1 and 2 are the predicted values and the results of Steps 4 and 5 are the corrected or estimated values.

The form of {25} requires that the observations $\bar{z}_k$ are a linear transform $H_k$ of the state vector $\bar{x}_k$. However, if the observations are magnetic field measurements collected over an array of sensors then the relationship between $\bar{z}_k$ and $\bar{x}_k$ is necessarily nonlinear, and is determined by the physics of magnetostatics. By means of the present invention an estimate of the source position $\hat{r}'_k$, which is computed from the array measurements in two compounded linear inversions, is substituted for the observation vector $\bar{z}_k$. Now the observation matrix $H_k$ identically transforms the positional components of the state vector $\bar{x}_k$.

$$\bar{z}_k = \hat{r}'_k = |I \cdots 1| \begin{vmatrix} \bar{r}'_k \\ \vdots \end{vmatrix} + \bar{v}_k, \quad H_k = |I \cdots 1| \quad \{28\}$$

The source position $\bar{r}'_k$ is estimated as an offset according to {15} using the predicted position of Step 2 as the origin $\bar{r}_o$. This ensures that the offset is small compared to the distance to the sensors, which provides an accurate estimate of $\hat{r}'_k$ in one step. Thus the linear perturbation process is inserted between Steps 2 and 3 of the Kalman filter process. Also, the measurement error covariance $R_k$ of Step 3 is replaced by $R_r$ of {24}.

Figure 3:
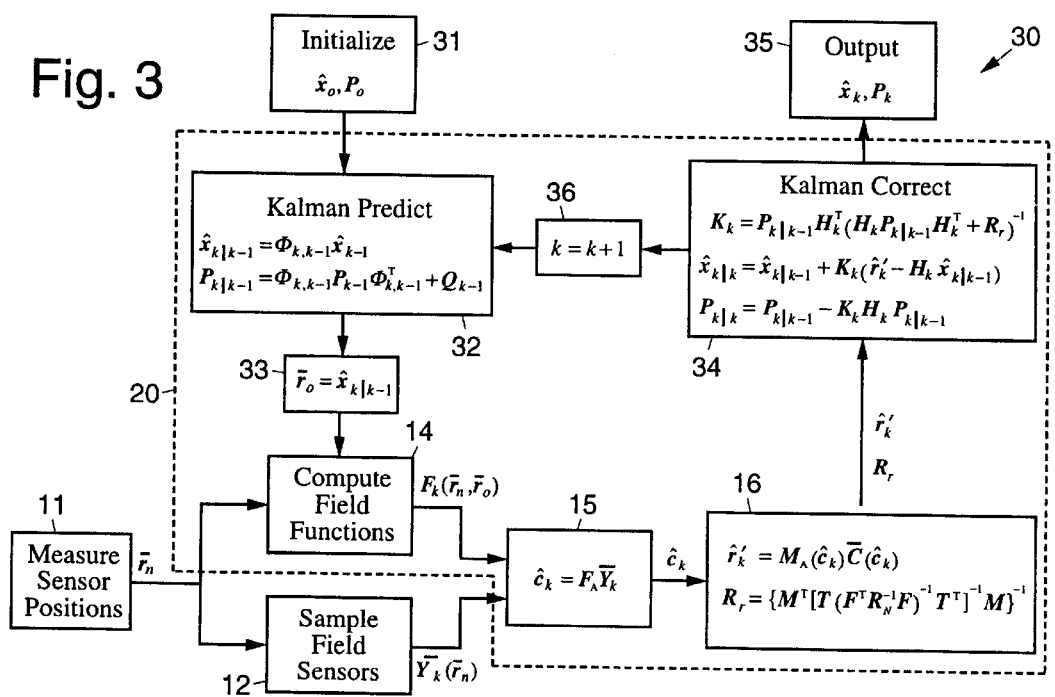
FIG. 3 illustrates a processing flow diagram for source localization by Kalman filter tracking in accordance with the principles of the present invention.

Referring now to FIG. 3, it illustrates a processing flow diagram for source localization by Kalman filter tracking 30 in accordance with the present invention. The state vector $\hat{x}_o$ and its error covariance $P_o$ must be initialized 31 by some means that would normally derive from a detection processor. That is, tracking is normally initiated after a source signal has been declared. A Kalman filter then predicts 32 the future state vector and the error covariance associated with the state vector (steps 1 and 2 above). Sensor positions $\bar{r}_n$ may be measured 11 once if the sensors are fixed, or concurrently with each magnetic field measurement $\bar{Y}_k$ 12 if the sensors are moving. $\bar{Y}_k$ may include measurements collected from multiple sensors at a single instant, or from a single sensor at multiple instants, or as a combination of multiple sensors collected over multiple instants in time. The field source origin $\bar{r}_o$ is extracted 33 from the predicted state vector $\hat{x}_{k|k-1}$.

The magnetic field functions $F_k(\bar{r}$hd n, $\bar{r}_o)$ are computed 14 in accordance with {2} and formatted into a matrix in accordance with {6}. The k subscript emphasizes that these functions depend on the field source origin, or track, at each processing cycle. It is important to note that the n-th sensor at $\bar{r}_n$ may measure only one or two of the vector components of the magnetic field and that it is not necessary to measure all three components. If the sensor measures only the scalar magnitude of the field it may be treated as a single axis measurement in that the source field is projected along the vector of the dominant background of the earth's magnetic field. Next, the multipole coefficients $\hat{c}_k$ are computed 15 in accordance with {20}, the dipole source location $\hat{r}'_k$ and the associated localization error $R_r$ are computed 16 in accordance with {22} and {24}, respectively. Then the corrected state vector $\hat{x}_{k|k}$ is computed 34 from these transformations of the magnetic field measurements. In computing the corrected state vector, the optimal gain matrix $K_k$ is computed (step 3 above) which determines how much the new measurement data will affect the estimator, the predicted state vector is computed according to the new measurements (step 4 above), and the associated error covariance of the state vector is corrected (step 5 above). The Kalman prediction and correction processing is iterated 36 continuously as time evolves.

The state vector output 35 represents an optimal estimate of the source track. An associated estimate of the optimal source dipole moment vector $\hat{m}_k$ has not been shown, but may be computed in the same manner as shown in FIG. 1 by extracting the source location from the corrected state vector. This last step is necessary because the error in the dipole moment estimate contained in the higher ranking $\hat{c}_k$ vector is substantially larger than the error in that results when the rank one moment is estimated.

Figure 4:
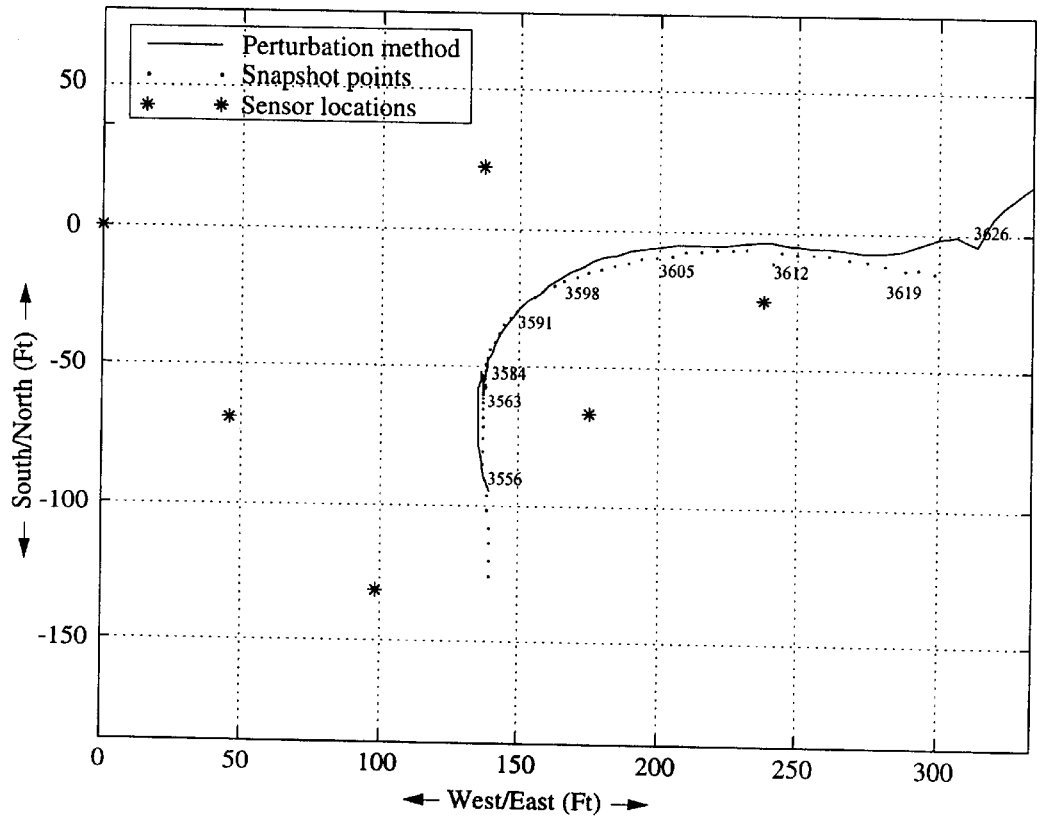
FIG. 4 illustrates an exemplary linear perturbation method for Kalman filter tracking using actual experimental measurements.

An example is provided which demonstrates the present linear perturbation method for the Kalman tracking of a magnetic object. Actual vector magnetometer data (3 axis) collected during the Internetted Unattended Ground Sensor (IUGS) Demonstration in December, 1996 was used in this test case. During the IUGS demonstration, a Toyota Celica was driven along a number of simple paths past a set of six fixed vector magnetometers. The test cases included the Celica traveling in straight lines (in both East-West and North-South directions), moving in large circles near the sensor field, and performing left/right turns interior to the sensor field. In the case chosen, the Celica traveled nearly due North to a point interior to the sensor field, decelerated to a stop, and then accelerated prior to turning right and heading east away from the sensor field. The sensor configuration and the track history are shown in FIG. 4. FIG. 4 illustrates an exemplary linear perturbation method for Kalman filter tracking using actual experimental measurements.

The six vector sensor locations are indicated by the asterisks. The track produced using the linear perturbation method 20 is shown as a solid line. The dots correspond to the individual dipole position estimates obtained by searching for a peak correlation in the matched filter approach (as in U.S. Pat. No. 5,731,996). The concentration of dots near (140, -50) is consistent with the vehicle stopping prior to turning right. The numbers appended to the track history dots indicate sample numbers corresponding to a sample rate of 4.65 Hz. Therefore, the sample numbers shown in increments of 10 in the FIG. 4 correspond to time increments of 2.15 seconds.

Since consecutive position estimates are made independently from sample to sample, the target dynamics are not being exploited as they are in the linear perturbation Kalman tracking method 20, 30 of the present invention. In this example, it is assumed that the Kalman tracker is initialized using a maximum likelihood dipole position estimate obtained using a process such as is described in U.S. Pat. No. 5,731,996. As described above, the Kalman tracker first predicts the next location of the target using its underlying plant model, given by {25}, and then corrects the predicted value using the linear perturbation {15} to obtain the new position estimate. Since the predicted dipole positions tend to be in the vicinity of the true dipole location, the perturbations are in turn fairly accurate. The track history of the perturbation method is consistent with written logs of the Celica's true track and follows rather closely the track developed with individual dipole position estimates made independently from time sample to time sample. However, the perturbation method 20 requires no search to estimate dipole position and therefore requires much less processing.

Thus, an improved linear perturbation method that provides for Kalman filter tracking of magnetic field sources has been disclosed. It is to be understood that the above-described embodiment is merely illustrative of some of the many specific embodiments that represent applications of the principles of the present invention. Clearly, numerous and other arrangements can be readily devised by those skilled in the art without departing from the scope of the invention.

What is claimed is:

1. A method for computing magnetic field functions of a magnetic field source comprising the steps of:
   determining positions of a plurality of magnetic field sensors;
   hypothesizing an origin of the magnetic field source; and
   computing multipole magnetic field functions of the magnetic field source using said position determination and said origin hypothesis.

2. The invention of claim 1 further including the step of determining the respective magnetic fields derived from the sensors.

3. The invention of claim 2 further including the step of determining the respective magnetic fields derived from the sensors to provide a magnetic field strength measurement at each sensor.

4. The invention of claim 3 further including the step of computing multipole coefficients of the magnetic field source.

5. The invention of claim 4 wherein said coefficients are computed using said magnetic field strength measurements and the magnetic functions.

6. The invention of claim 5 further including the step of using the multipole coefficients to estimate the location of the magnetic field source.

7. The invention of claim 6 further including the step of setting the origin to a newly computed source location and the previous three steps are repeated until the convergence limit is reached if the distance of the estimated location of the magnetic field source to the origin exceeds a convergence limit.

8. The invention of claim 7 further including the step of computing rank of two field functions after the convergence limit is reached.

9. The invention of claim 8 further including the step of computing an estimate of the magnetic dipole moment of the magnetic field source.

10. The invention of claim 9 further including the step of outputting the magnetic source location and the magnetic dipole moment of the magnetic field source.

11. The invention of claim 10 including the step of measuring sensor positions once if the sensors are fixed.

12. The invention of claim 11 wherein the measuring step includes the step of measuring sensor positions concurrently with each magnetic field measurement if the sensors are moving.

13. The invention of claim 12 wherein the magnetic field measurement includes measurements collected from multiple sensors at a single instant.

14. The invention of claim 13 wherein the magnetic field measurement includes measurements collected from a single sensor at multiple instants.

15. The invention of claim 14 wherein the magnetic field measurement includes measurements collected from a combination of multiple sensors collected over multiple instants in time.

16. A method for tracking a magnetic field source using Kalman filter tracking, comprising the steps of:
   computing an initial position estimate of a magnetic field source;
   initializing a state vector and its error covariance matrix for a magnetic field source; and
   processing the state vector and error covariance matrix using a Kalman filter to predict a future state vector and its error covariance matrix of the magnetic field source using a linear perturbation process.

17. The invention of claim 16 including the step of extracting the field source origin from the predicted state vector.

18. The invention of claim 17 including the step of determining positions of a plurality of magnetic field sensors.

19. The invention of claim 18 including the step of computing magnetic field functions.

20. The invention of claim 19 including the step of computing multipole coefficients.

21. The invention of claim 20 including the step of computing dipole source location and its associated localization error.

22. The invention of claim 21 including the step of computing a corrected state vector.

23. The invention of claim 22 including the step of iterating the Kalman prediction and correction processing continuously as time evolves.

24. The invention of claim 23 including the step of outputting a state vector that represents an optimal estimate of the track of the magnetic field source.

25. The invention of claim 24 wherein the sensors measure the scalar magnitude of the magnetic field derived from the magnetic field source.

26. The invention of claim 25 wherein the step of computing the corrected state vector comprises the steps of:
   computing the optimal gain matrix to determines how much the measurement data affects the estimation;
   computing the predicted state vector; and
   correcting the associated error covariance of the state vector.

27. The invention of claim 26 wherein the measuring step measures sensor positions once if the sensors are fixed.

28. The invention of claim 27 wherein the measuring step measures sensor positions concurrently with each magnetic field measurement if the sensors are moving.

29. The invention of claim 28 wherein the magnetic field measurement includes measurements collected from multiple sensors at a single instant.

30. The invention of claim 29 wherein the magnetic field measurement includes measurements collected from a single sensor at multiple instants.

31. The invention of claim 30 wherein the magnetic field measurement includes measurements collected from a combination of multiple sensors collected over multiple instants in time.

* * * * *